May 25, 1971     J. O. LEE     3,579,708
SPRING CHECK
Filed March 24, 1969
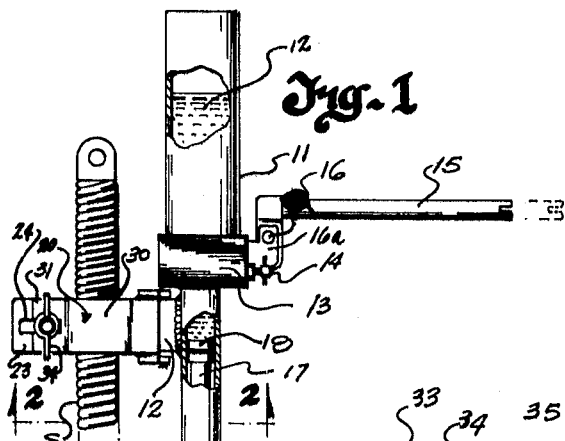
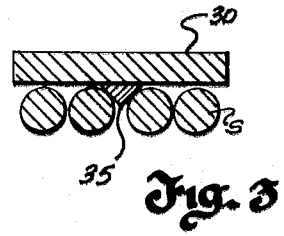
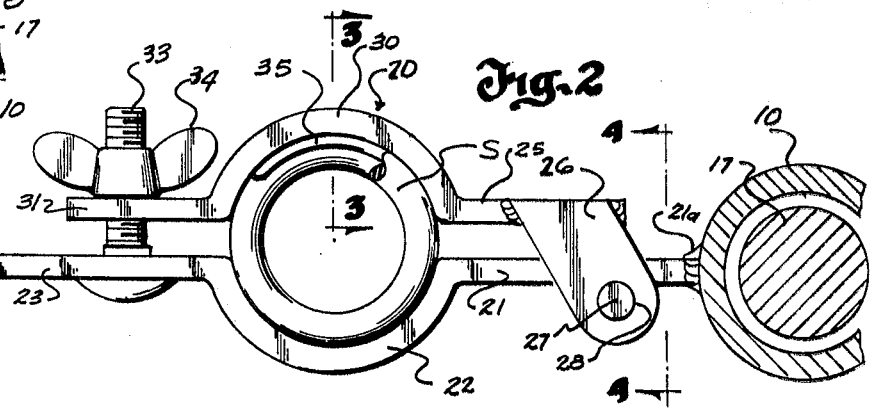
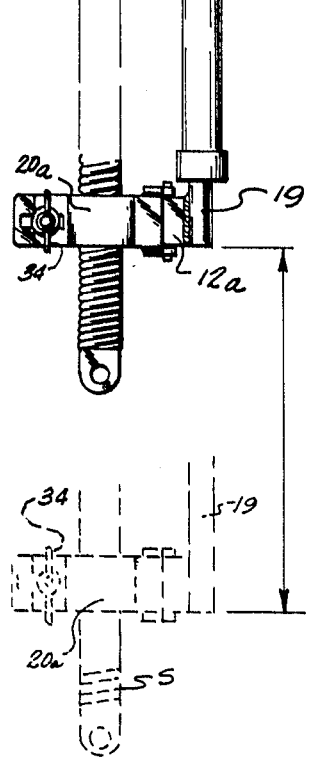
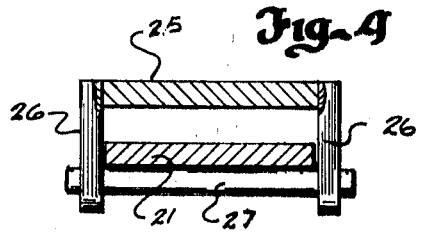
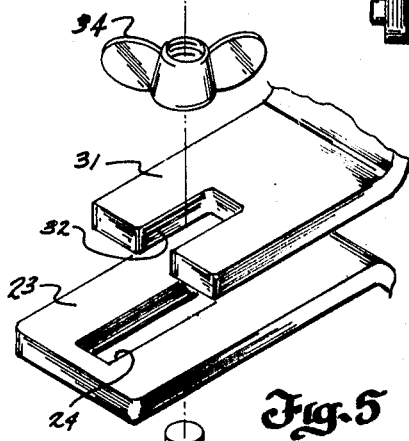
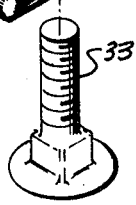
INVENTOR.
JAMES O. LEE
BY
AGENT 3,579,708
SPRING CHECK
James O. Lee, 243 Olive, Claremont, Calif. 91711
Filed Mar. 24, 1969, Ser. No. 809,613
Int. Cl. E05f 3/10
U.S. Cl. 16—52                          1 Claim

ABSTRACT OF THE DISCLOSURE

A spring check comprising a hydraulic cylinder having a piston movable therein, a fastener on the cylinder for connection to one end of the spring, a second fastener on the extending end of the piston for connection to the other end of the spring, a fluid receptacle, and an adjustable check valve between the receptacle and the hydraulic cylinder, the fastener consisting of a pair of pivotally connected plates having arcuate portions surrounding the spring, and a bolt and wing nut connection for clamping the plates about the spring.

---

This invention relates to a spring check, and has particular applicability to a device for checking the spring closure of a garage door or the like.

A primary object of this invention is the provision of a device of this character which will retard the spring action of a coil spring utilized in closing a door to avoid slamming or damaging the door.

An additional object of the invention is the provision of an improved means for fastening such a check to a coil spring in order to insure its permanent positioning thereon, and to avoid slippage or dislocation of the device.

A further object of the invention is the provision of a device of this character which is sturdy and durable in construction, reliable and efficient in operation, and relatively simple to manufacture, assemble and utilize.

Other objects will in part be obvious and in part be pointed out as the description of the invention proceeds and is shown in the accompanying drawings wherein there is disclosed a preferred embodiment of this inventive concept.

Briefly, the invention consists of a hydraulic cylinder having a piston movable therein, a reservoir for the cylinder, an adjustable check valve between the cylinder and the reservoir, and a pair of clip members, one secured to the cylinder and one to the extending end of the piston, adapted to be secured to opposite ends of a coil spring for retarding the compression thereof.

In the drawings:

FIG. 1 is a side elevational view partially broken away, of one form of device constructed in accordance with the instant invention, shown as attached to a closure spring;

FIG. 2 is an enlarged sectional view taken substantially along the line 2—2 of FIG. 1 as viewed in the direction indicated by the arrows;

FIG. 3 is a sectional view taken substantially along the line 3—3 of FIG. 2 as viewed in the direction indicated by the arrows;

FIG. 4 is a sectional view taken substantially along the line 4—4 of FIG. 2 as viewed in the direction indicated by the arrows; and FIG. 5 is an exploded perspective view showing certain constructional details.

Similar reference characters refer to similar parts throughout the several views of the drawings.

Having reference now to the drawings in detail, the device of the instant invention comprises a hydraulic cylinder 10 having at one end thereof a reservoir 11 containing hydraulic fluid 12. A conventional check valve 13 is positioned between the cylinder and the reservoir, which will permit uninterrupted flow of fluid into the cylinder upon extension of the piston, but which will retard its return to the reserovir as the piston is compressed into the cylinder.

The usual bleed valve 14 is provided, as is a pivoted adjusting rod 15, pivoted as at 16 to a bracket 16a extending from the valve housing. Contained within the cylinder 10 is a piston rod 17 having a head 18, the end of the rod protruding from the cylinder as at 19. A first securing clip generally indicated at 20 is secured to cylinder 10 at a point adjacent valve 13, while a substantially identical securing clip generally indicated at 20a is secured to the projecting end 19 of piston rod 17. The two clips are adapted to be secured adjacent opposite ends of a coil spring S, which in turn has its opposite ends connected to a garage door or the like and its supporting frame. Each clip consists of a plate 21 secured as by welding 21a to its adjacent member, as shown in FIG. 2, to hydraulic cylinder 10. Plate 21 has an arcuate semicircular mid portion 22 and an extending end portion 23 provided with an elongated slot 24. A second clamping plate 25 is provided with a pair of inclined substantially perpendicular ears 26 which extend, as best shown in FIG. 4, on opposite sides of plate 21. To the rear of plate 21 adjacent its inner end is a rod or pivot 27, the ends of which extend through suitable openings 28 and the ends of ears 26 so that plate 25 is pivotally secured to its associated plate 21. Plate 25 has a corresponding semicircular arcuate portion 30 in alignment with portion 22 and a projecting end portion 31, which, as best shown in FIG. 5, is provided adjacent its end with an open-ended slot 32. A bolt 33 extends through aligned slots 24 and 32 and has mounted on its extremity a wing nut 34. Arcuate portion 30 is provided, as shown in FIGS. 2 and 3, with an inwardly protruding triangular rib 35 which engages between adjacent coils of spring S in order to prevent lateral dislodgment of the clips on expansion of the spring. While clip 20 has been described in detail, it is to be understood that clip 20a is identical thereto, except that it is attached to the projecting end 19 of piston 17 rather than to cylinder 10.

In the use and operation of the device one clip 20 is secured about spring S, by releasing wing nut 34 and sliding bolt 33 out of open-ended slot 32. Opposite arcuate portions 30 and 22 are then aligned in position about spring S, bolt 33 is re-engaged in slot 32, and wing nut 34 tightened to clamp the device in position. Rib 35 prevents slippage of the clip on the spring. With the spring in contracted position, the other clip 20a is similarly attached to its opposite end. When the spring is expanded, piston 17 is withdrawn from cylinder 10 to the requisite extent. As the spring contacts, piston 17 re-enters cylinder 10 and its enlarged head 18 is retarded by the rate of flow of fluid 12 through check valve 13. The rate of flow is adjusted in a conventional manner by adjusting rod 15.

From the foregoing it will now be seen that there is herein provided an improved spring check and means for attaching the same to a spring, which accomplishes all of the objects of this invention, and others, including many advantages of great practical utility and commercial importance.

What is claimed is:

1. A spring check comprising a hydraulic cylinder, a fluid reservoir communicating with said cylinder, a check valve between said cylinder and said reservoir, means for regulating said check valve, a piston movable in said cylinder and having one end projecting therefrom, fastening means on said cylinder adjacent the reservoir encircling and grippingly engaging one end of a coil spring, and fastening means on the projecting end of said piston encircling and grippingly engaging the other end of said spring, said fastening means each comprising a pair of plates, one plate having a pair of spaced apertured ears thereon, and the other plate having pin means thereon extending through said apertures to provide a pivotal connection between said plates, said plates having opposed arcuate portions adapted to encircle said spring, said portions containing a rib therein adapted to interfit between adjacent coils of said spring to prevent longitudinal slippage of said fastener, during movement of said spring, securing means for latching the free ends of and clamping said plates about said spring, and the opposite ends of said spring being respectively connected to a door and its supporting structure.

References Cited
UNITED STATES PATENTS

| | | | |
|---|---|---|---|
| 3,479,441 | 11/1969 | Moore | 24—132X |
| 3,150,539 | 9/1964 | Wallis, Jr. | 24—122.3X |
| 2,585,413 | 2/1952 | Simpson | 16—66 |
| 2,543,565 | 2/1951 | Billingsley | 16—66 |
| 1,883,041 | 10/1932 | Somers | 24—248X |
| 1,736,175 | 11/929 | Rosenthal et al. | 16—51 |
| 1,735,212 | 11/1929 | Pawsat | 24—125KX |

BOBBY R. GAY, Primary Examiner

P. A. ASCHENBRENNER, Assistant Examiner

U.S. Cl. X.R.

16—66; 267—124